US010470142B2

(12) United States Patent
Ly et al.

(10) Patent No.: US 10,470,142 B2
(45) Date of Patent: Nov. 5, 2019

(54) SYNCHRONIZATION AND REFERENCE SIGNAL FOR UPLINK BASED MOBILITY

(71) Applicant: QUALCOMM Incorporated, San Diego, CA (US)

(72) Inventors: Hung Ly, San Diego, CA (US); Haitong Sun, San Diego, CA (US); Tingfang Ji, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 152 days.

(21) Appl. No.: 15/589,683

(22) Filed: May 8, 2017

(65) Prior Publication Data

US 2018/0077660 A1 Mar. 15, 2018

Related U.S. Application Data

(60) Provisional application No. 62/393,295, filed on Sep. 12, 2016.

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0048* (2013.01); *H04W 4/027* (2013.01);
(Continued)

(58) Field of Classification Search
CPC ..... H04W 56/001; H04W 4/027; H04W 8/08; H04W 24/10; H04W 36/0005;
(Continued)

(56) References Cited

U.S. PATENT DOCUMENTS

2013/0279486 A1* 10/2013 Kato ................. H04W 56/0005
370/336
2014/0146788 A1* 5/2014 Wallentin .............. H04W 36/32
370/331
(Continued)

FOREIGN PATENT DOCUMENTS

| WO | WO-2013/081293 A1 | 6/2013 |
| WO | WO-2016/122279 A1 | 8/2016 |
| WO | WO-2017/139050 A1 | 8/2017 |

OTHER PUBLICATIONS

International Search Report and Written Opinion—PCT/US2017/049830—ISA/EPO—dated Nov. 22, 2017. 23 pages.
(Continued)

*Primary Examiner* — Habte Mered
(74) *Attorney, Agent, or Firm* — Arent Fox LLP

(57) ABSTRACT

Various aspects relate to flexible mobility for a user equipment (UE) based on supported mobility modes of a network and UE conditions. A network may support one or more of a downlink based mobility mode, an uplink based mobility mode, or a hybrid mobility mode for a connectivity state of a UE. A UE may determine a serving cell based on at least one downlink signal. The UE may determine based on the at least one downlink signal, a set of supported mobility modes for the serving cell, including at least one of a downlink based mobility mode, an uplink based mobility mode, or a hybrid based mobility mode. The UE may follow a mobility procedure based on a selected mobility mode from the determined set of supported mobility modes. Other aspects relate to a base station transmitting synchronization signals to support flexible mobility.

26 Claims, 11 Drawing Sheets

(51) Int. Cl.
*H04W 4/02* (2018.01)
*H04W 8/08* (2009.01)
*H04W 24/10* (2009.01)
*H04W 52/04* (2009.01)
*H04W 72/04* (2009.01)
*H04W 36/00* (2009.01)
*H04W 88/02* (2009.01)

(52) U.S. Cl.
CPC .............. *H04W 8/08* (2013.01); *H04W 24/10* (2013.01); *H04W 36/0005* (2013.01); *H04W 36/0061* (2013.01); *H04W 52/04* (2013.01); *H04W 72/0406* (2013.01); *H04W 88/02* (2013.01)

(58) Field of Classification Search
CPC .............. H04W 36/0061; H04W 52/04; H04W 72/0406; H04L 5/0048
See application file for complete search history.

(56) References Cited

U.S. PATENT DOCUMENTS

| | | | | |
|---|---|---|---|---|
| 2015/0163687 | A1* | 6/2015 | Lee | H04W 24/10 370/252 |
| 2015/0358094 | A1* | 12/2015 | Yi | H04B 17/318 370/252 |
| 2017/0366996 | A1* | 12/2017 | Park | H04W 48/08 |
| 2017/0374587 | A1* | 12/2017 | Liu | H04L 5/0048 |
| 2018/0007574 | A1* | 1/2018 | Park | H04B 7/04 |
| 2018/0049113 | A1* | 2/2018 | Jung | H04L 5/0048 |
| 2018/0083722 | A1* | 3/2018 | Reial | H04B 17/382 |
| 2018/0167856 | A1* | 6/2018 | Li | H04W 72/042 |
| 2018/0248736 | A1* | 8/2018 | Davydov | H04B 7/024 |
| 2018/0249400 | A1* | 8/2018 | Harada | H04W 16/32 |
| 2018/0332511 | A1* | 11/2018 | Fan | H04W 36/0094 |

OTHER PUBLICATIONS

Qualcomm Incorporated: "DL and UL based Mobility Procedures" 3GPP Draft; R1-166386, 3rd Generation Partnership Project (3GPP), Mobile Competence Centre, 650, Route Des Lucioles, F-06921, Sophia-Antipolis Cedex, France, vol. RAN WG1, No. Gothenburg, Sweden; Aug. 21, 2016, XP051125353, Retrieved from the Internet: URL:http://www.3gpp.org/ftp/Meetings_3GPP_SYNC/RAN1/Docs/ [retrieved on Aug. 21, 2016], 4 pages.

Qualcomm Incorporated, "High Speed Mobility Performance Evaluations", 3GPP Draft, R1-166393, High Speed Mobility Performance Evaluations, 3rd Generation Partnership Project (3GPP), Mobile Competence Centre, 650, Route Des Lucioles, F-06921, Sophia-Antipolis Cedex, France, RAN WG1, Gothenburg, Sweden, Aug. 22, 2016-Aug. 26, 2016, Aug. 21, 2016 (Aug. 21, 2016), 9 pages, XP051125355, Retrieved from the Internet: URL:http://www.3gpp.org/ftp/Meetings3GPPSYNC/RAN1/Docs/ [retrieved on Aug. 21, 2016].

Qualcomm Incorporated: "Single Beam Synchronization Design", 3GPP Draft; R1-1610156, Single Beam Sync Design, 3rd Generation Partnership Project (3GPP), Mobile Competence Centre; 650, Route Des Lucioles; F-06921 Sophia-Anti Polls Cedex; France, vol. RAN WG1, No. Lisbon, Portugal; Sep. 10, 2016-Sep. 14, 2016, Oct. 9, 2016 (Oct. 9, 2016), XP051150179, 6 Pages, Retrieved from the Internet: URL: http://www.3gpp.org/ftp/Meetings_3GPP_SYNC/RAN1/Docs/ [retrieved on Oct. 9, 2016].

Qualcomm Incorporated: "NR DL/UL based Mobility for Active and Inactive States", 3GPP Draft; R1-1612043, 3rd Generation Partnership Project (3GPP), Mobile Competence Centre, 650, Route Des Lucioles, F-06921, Sophia-Antipolis Cedex, France, vol. RAN WG1, No. Reno, USA; Nov. 13, 2016, XP051176004, Retrieved from the Internet: URL:http://www.3gpp.org/ftp/Meetings_3GPP_SYNC/RAN1/Docs/ [retrieved on Nov. 13, 2016], 7 pages.

Qualcomm Incorporated: "UL based Mobility DL Channels", 3GPP Draft; R1-1612041, 3rd Generation Partnership Project (3GPP), Mobile Competence Centre, 650, Route Des Lucioles, F-06921, Sophia-Antipolis Cedex, France, vol. RAN WG1, No. Reno, Nevada, USA; Nov. 13, 2016, XP051176002, Retrieved from the Internet: URL:http://www.3gpp.org/ftp/Meetings_3GPP_SYNC/RAN1/Docs/ [retrieved on Nov. 13, 2016], 3 pages.

Qualcomm Incorporated, "Uplink Based Mobility Physical Channels", 3GPP Draft, R1-166387, 3<sup>rd</sup> Generation Partnership Project (3GPP), Mobile Competence Centre, 650, Route Des Lucioles, F-06921, Sophia-Antipolis Cedex, France, RAN WG1, Gothenburg, Sweden, Aug. 22, 2016-Aug. 26, 2016, Aug. 21, 2016 (Aug. 21, 2016), 5 pages, XP051125354, Retrieved from the Internet: url:http://www.3gpp.org/ftp/Meetings3GPPSYNC/RAN1%20/Docs/ [retrieved on Aug. 21, 2016].

\* cited by examiner

SYNCHRONIZATION AND REFERENCE SIGNAL FOR UPLINK BASED MOBILITY

CLAIM OF PRIORITY UNDER 35 U.S.C. § 119

This application claims priority to U.S. Provisional Application No. 62/393,295, titled "SYNCHRONIZATION AND REFERENCE SIGNAL FOR UPLINK BASED MOBILITY," filed Sep. 12, 2016, which is assigned to the assignee hereof, and incorporated herein by reference in its entirety.

BACKGROUND

Aspects of this disclosure relate generally to telecommunications, and more particularly to signals used for mobility in wireless communication systems.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, 5G new radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond. Preferably, these improvements should be applicable to other multi-access technologies and the telecommunication standards that employ these technologies.

Known communications systems such as long term evolution (LTE) and high-speed packet access (HSPA) may use downlink based mobility procedures to change a serving cell of a UE. In a downlink based mobility procedure, the UE may measure downlink signals from a serving cell and/or neighbor cells. The UE and/or the network may then determine whether the UE should change cells based on the quality of the downlink signals.

It is envisaged that 5G NR will, in some cases, allow a user equipment (UE) to transition between connectivity states for radio resource control (RRC). An RRC-Idle state may be an initial state where the UE has no context in a radio access network (RAN) and is not assigned any air interface resources. An RRC-Common state may be used when a UE has little traffic. In the RRC-Common state, the UE may have a context in the radio access network but no assigned air interface resources. An RRC-Dedicated state may be used when a UE has large amounts of traffic (e.g., active applications or streams). In the RRC-Dedicated state, a UE may have a context in the radio access network and be assigned air interface resources.

In some cases, a downlink based mobility procedure may not be ideal for a UE. In an uplink based mobility procedure, one or more base station may measure a signal transmitted by the UE. The network may then determine whether to change the serving cell for the UE. Due to the various connectivity states in 5G NR, there is a need for the UE to be able to obtain information to complete either a downlink, uplink, or hybrid mobility procedure in various connectivity states.

SUMMARY

The present disclosure provides for mobility of a user equipment using a selected mobility mode. For uplink based mobility, the disclosure provides for synchronization and reference signals that allow a UE to discover a zone of cells where uplink based mobility may be implemented such that the network controller can select a cell within the zone to serve UE without the need of neighbor cell search and measurement at UE. A network may support one or more of a downlink based mobility mode, an uplink based mobility mode, or a hybrid mobility mode for a connectivity state of a UE. A UE in an idle state may determine a serving cell based on at least one downlink signal. The UE may determine based on the at least one downlink signal, a set of supported mobility modes for use in a non-idle state, including at least one of a downlink based mobility mode, an uplink based mobility mode, or a hybrid based mobility mode. The UE may follow a mobility procedure based on a selected mobility mode from the determined set of supported mobility modes.

In an aspect, the disclosure provides a method of wireless communications for a user equipment (UE). The method may include determining, by the UE, a serving cell based on at least one downlink signal. The method may also include determining, by the UE, based on the at least one downlink signal, a set of supported mobility modes for the serving cell, including at least one of a downlink based mobility mode, an uplink based mobility mode, or a hybrid based mobility mode. The method may also include following a mobility procedure based on a selected mobility mode from the determined set of supported mobility modes.

In another aspect, the disclosure provides a UE including a transceiver configured to receive at least one downlink signal. The UE may include a memory and a processor communicatively coupled with the transceiver and the memory. The processor and the memory may be configured to determine a serving cell based on at least one downlink signal. The processor and the memory may be configured to determine, based on the at least one downlink signal, a set of supported mobility modes for the serving cell, including at least one of a downlink based mobility mode, an uplink based mobility mode, or a hybrid based mobility mode. The processor and the memory may be configured to follow a mobility procedure based on a selected mobility mode from the determined set of supported mobility modes.

In another aspect, the disclosure provides another UE including means for determining, by the UE, a serving cell based on at least one downlink signal. The UE may include means for determining, by the UE, based on the at least one downlink signal, a set of supported mobility modes for the serving cell, including at least one of a downlink based mobility mode, an uplink based mobility mode, or a hybrid based mobility mode. The UE may include means for following a mobility procedure based on a selected mobility mode from the determined set of supported mobility modes.

In another aspect, the disclosure provides a computer readable medium for mobility of a UE in wireless communications. The computer readable medium may include code for determining, by the UE, a serving cell based on at least one downlink signal. The computer readable medium may include code for determining, by the UE, based on the at least one downlink signal, a set of supported mobility modes for the serving cell, including at least one of a downlink based mobility mode, an uplink based mobility mode, or a hybrid based mobility mode. The computer readable medium may include code for following a mobility procedure based on a selected mobility mode from the determined set of supported mobility modes.

In another aspect, the disclosure provides a method of wireless communications performed by a base station. The method may include transmitting, from a cell that is synchronized with a group of cells in a zone, a zone-specific measurement reference signal (MRS-Z). The method may include transmitting a cell-specific synchronization signal including a cell specific secondary synchronization signal (SSS-C), a cell-specific physical broadcast channel (PBCH-C), and a cell-specific measurement reference signal (MRS-C). The method may include receiving the measurement report or the uplink measurement indication signal based on the transmitted signals. The method may include performing a mobility procedure based on the measurement report or the uplink measurement indication signal.

In another aspect, the disclosure provides a base station including a transceiver configured to transmit at least one downlink signal. The base station may include a memory and a processor communicatively coupled with the transceiver and the memory. The processor and the memory may be configured to transmit, from a cell that is synchronized with a group of cells in a zone, from a cell that is synchronized with a group of cells in a zone, a zone-specific measurement reference signal (MRS-Z). The processor and the memory may be configured to transmit a cell-specific synchronization signal including a SSS-C, a PBCH-C, and a MRS-C, wherein the MRS-Z includes information for a UE to transmit a uplink measurement indication signal and to perform zone-specific radio tracking; and the PBCH-C includes information for the UE to transmit a measurement report. The processor and the memory may be configured to receive the measurement report or the uplink measurement indication signal based on the transmitted signals. The processor and the memory may be configured to perform a mobility procedure based on the measurement report or the uplink measurement indication signal.

In another aspect, the disclosure provides a base station including a transceiver configured to transmit zone-specific information in system information or in an RRC message. For example, the zone-specific information may include a zone identifier.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
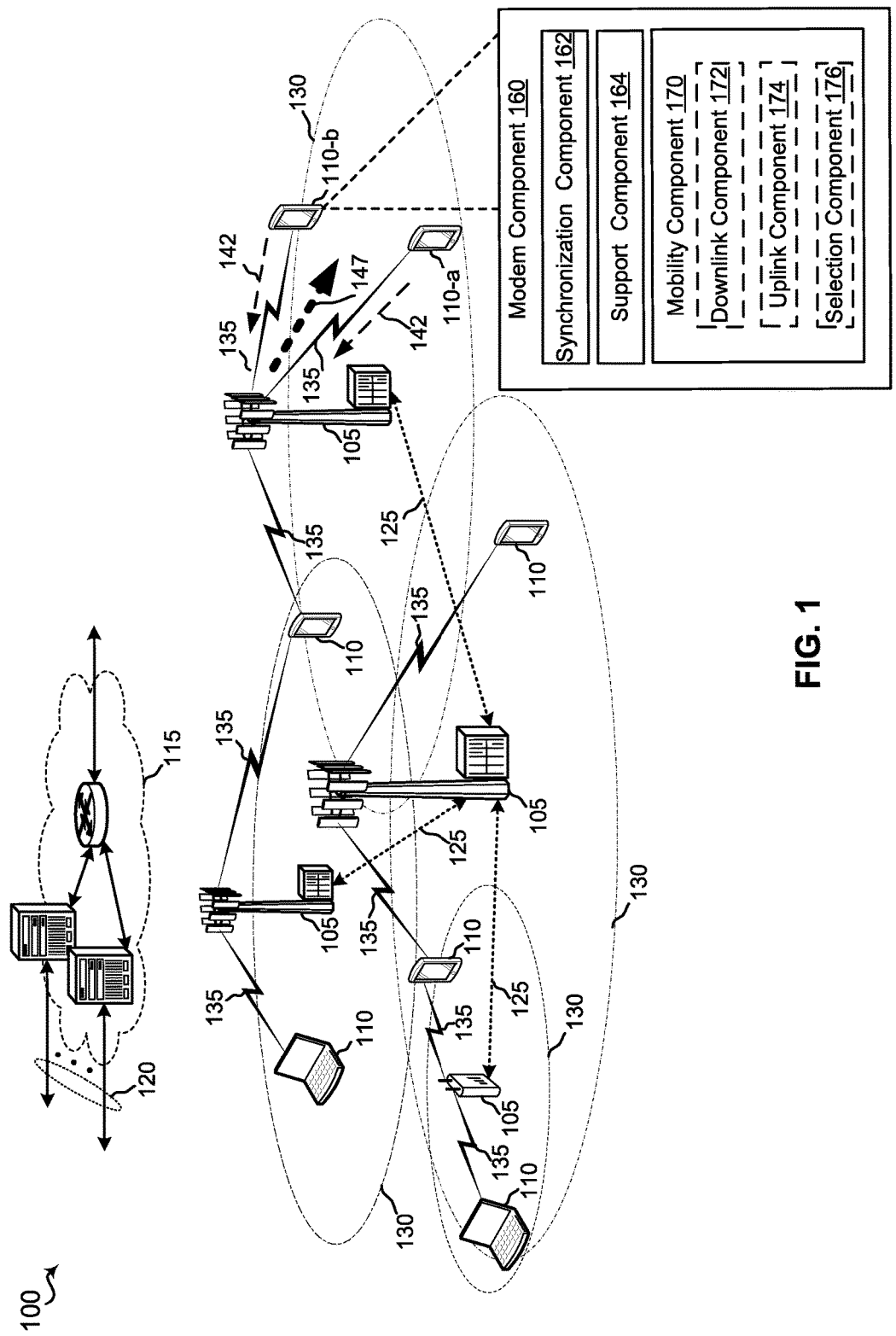
FIG. 1 is a schematic diagram of a wireless communication network in accordance with an exemplary embodiment.

As discussed above, emerging 5G or NR communications technology, may employ multiple connectivity states. Generally, conventional technologies utilize a downlink based mobility procedure regardless of the UE mobility state. In an NR system, a network may support various mobility procedures that may be beneficial in various conditions. A downlink based mobility mode may involve the UE measuring signals from one or more cells and the UE or network selecting a serving cell based on the UE measurements. An uplink based mobility mode may involve the UE transmitting an uplink measurement indication signal that the network uses to determine a serving cell for the UE. In uplink based mobility, cells may be organized into synchronized groups referred to herein as zones. The cells within a zone may form a single frequency network (SFN). One cell within the zone may be selected as the serving cell for a UE, but the UE does not need to be aware of which cell within the zone is the serving cell. Instead, the UE treats the zone as a serving zone. Uplink based mobility procedures for intra-zone mobility and inter-zone mobility may be different. In a hybrid mobility mode, the network may support either uplink based mobility procedures or downlink based mobility procedures. The UE may select a mobility procedure based on current conditions. For example, an uplink based mobility procedure may be desirable when a UE is in high mobility or experiencing poor channel conditions. In contrast, a downlink based mobility procedure may be desirable when the UE is in low mobility or experiencing good channel conditions.

In an aspect, the present disclosure provides for flexible mobility procedures based on supported mobility modes of a network and UE conditions. A network may support one or more of a downlink based mobility mode, an uplink based mobility mode, or a hybrid mobility mode for a connectivity state of a UE. In an aspect, when the UE is in an idle state (e.g., RRC-Idle), downlink-based mobility may be used as an anchored mobility mode. An anchored mobility mode may include a mobility mode that is supported by any cell in at least one state and supports other mobility modes in different states. For example, in the idle state, the UE may be able to establish a connection to a serving cell and transition to another state. The serving cell may also provide information regarding the mobility modes supported by the network while the UE is in an idle state. If multiple mobility modes are supported, the UE may select a mobility mode from the supported mobility modes. For example, the UE may select a mobility mode based on at least one of a speed estimate, a location of the UE, a received signal strength of the serving cell, or a received signal strength of a serving zone.

To support uplink based mobility, the network may provide synchronization signals and reference signals. The signals provided by an individual cell may depend on the mobility modes supported by the network or the individual cell. Generally, a cell that supports downlink based mobility may transmit a cell specific synchronization channel (SYNC) so that a UE may discover one or more neighbor cells. A cell that supports uplink based mobility may transmit at least a zone-specific measurement reference signal so that a UE may measure the zone, which may be identified by a serving cell. In an aspect, a cell that supports uplink based mobility may also transmit a zone-specific synchronization signal so that the UE may discover the zone, for example, as a neighbor zone for inter-zone mobility.

Various aspects are now described in more detail with reference to the FIGS. 1-10. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 having a modem component 160 configured to perform one or more techniques described herein. A base station 105 may also be configured to perform complementary techniques described herein at base station 105. For example, base station 105 may be configured to transmit the downlink signals described herein.

In an aspect, modem component 160 may include a synchronization component 162 configured to detect a cell ID or a zone ID based on at least one downlink signal transmitted by a cell. In an aspect, synchronization component 162 may detect a primary synchronization signal (PSS) and a secondary synchronization signal (SSS) to determine an identifier. In an aspect, the identifier may be a zone ID. In another aspect, synchronization component 162 may also detect a cell-specific secondary synchronization signal (SSS-C). Synchronization component 162 may determine a cell ID based on a combination of the PSS, SSS, and SSS-C as described in further detail below. Synchronization component 162 may also synchronize a receiver of the UE 110 with the cell and determine a time/frequency offset.

Modem component 160 may include a support component 164 configured to determine a set of mobility modes supported by wireless communication network 100 and base station 105 that is a serving cell for UE 110. Base station 105 may indicate the set of supported mobility modes using a physical broadcast channel (PBCH). The PBCH may be a zone-specific PBCH or a cell-specific PBCH. A zone-specific PBCH may be synchronously transmitted by each cell within a zone and may be the same signal for each of the cells in the zone. The zone-specific PBCH may include information applicable to all of the cells in the zone. A cell-specific PBCH may be transmitted by an individual cell and may include information unique to the individual cell. The support component 164 may decode the zone-specific PBCH to determine the set of supported mobility modes. If no zone-specific PBCH is available, the support component 164 may determine that the serving cell supports only downlink based mobility.

In some examples of the present disclosure, modem component 160 may include mobility component 170 for following a mobility procedure based on a selected mobility mode from the determined set of supported mobility modes. As described in further detail below, mobility component 170 may receive various synchronization and reference signals to identify a neighbor zone or neighbor cell. Mobility component 170 may then transmit one or more signals causing UE 110 to change serving cells. In an aspect, the mobility component 170 may include one or more subcomponents for performing various aspects of a mobility procedure specific to a selected mobility mode. In an aspect, mobility component 170 may optionally include a downlink component 172 for performing a downlink mobility procedure. In an aspect, mobility component 170 may optionally include an uplink component 174 for performing an uplink mobility procedure. In an aspect, mobility component 170 may optionally include a selection component 176 for selecting a mobility procedure when the network supports hybrid mobility. Mobility component 170 may then perform the selected mobility procedure using downlink component 172 or uplink component 174.

Wireless communication network 100 may include one or more base stations 105, one or more UEs 110, and a core network 115. Core network 115 may provide user authentication, access authorization, tracking, internet protocol (IP) connectivity, and other access, routing, or mobility functions. Base stations 105 may interface with core network 115 through backhaul links 120 (e.g., S1, etc.). Base stations 105 may perform radio configuration and scheduling for communication with UEs 110, or may operate under the control of a base station controller (not shown). In various examples, base stations 105 may communicate, either directly or indirectly (e.g., through core network 115), with one another over backhaul links 125 (e.g., X1, etc.), which may be wired or wireless communication links.

Base stations 105 may wirelessly communicate with UEs 110 via one or more base station antennas. Each of the base stations 105 may provide communication coverage for a respective geographic coverage area 130. In some examples, base stations 105 may be referred to as a transmit/receive point (TRP), base transceiver station, a radio base station, an access point, a radio transceiver, a NodeB, eNodeB (eNB), gNodeB (gNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the base stations 105 may operate according to different ones of a plurality of communication technologies (e.g., 5G, 4G/LTE, 3G, Wi-Fi, Bluetooth, etc.), and thus there may be overlapping geographic coverage areas 130 for different communication technologies.

In some examples, the wireless communication network 100 may be or include a Long Term Evolution (LTE) or LTE-Advanced (LTE-A) technology network. The wireless communication network 100 may also be a next generation technology network, such as a 5G wireless communication network. Moreover, the wireless communication network 100 may support high frequency operations such as millimeter wave communications. In LTE/LTE-A networks, the term evolved node B (eNB) may be generally used to describe the base stations 105, while the term UE may be generally used to describe the UEs 110. The wireless communication network 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). A micro cell may cover a larger geographic area than a pico cell or femto cell (e.g., a public building) and provide restricted access and/or unrestricted access by the UEs having an association with the micro cell. An eNB for a macro cell may be referred to as a macro eNB. An eNB for a small cell may be referred to as a small cell eNB, a pico eNB, a femto eNB, micro eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a personal digital assistant (PDA), a wireless modem, a wireless communication device, a handheld device, a tablet computer, a laptop computer, a cordless phone, a wireless local loop (WLL) station, an entertainment device, a vehicular component, or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, relay base stations, and the like.

A UE 110 may be configured to establish one or more wireless communication links 135 with one or more base stations 105. Wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple subcarriers (e.g., waveform signals of different frequencies) modulated according to the various radio technologies described above. Each modulated signal may be sent on a different subcarrier and may carry control information (e.g., reference signals, control channels, etc.), overhead information, user data, etc. In an aspect, the communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

The wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers.

Figure 2:
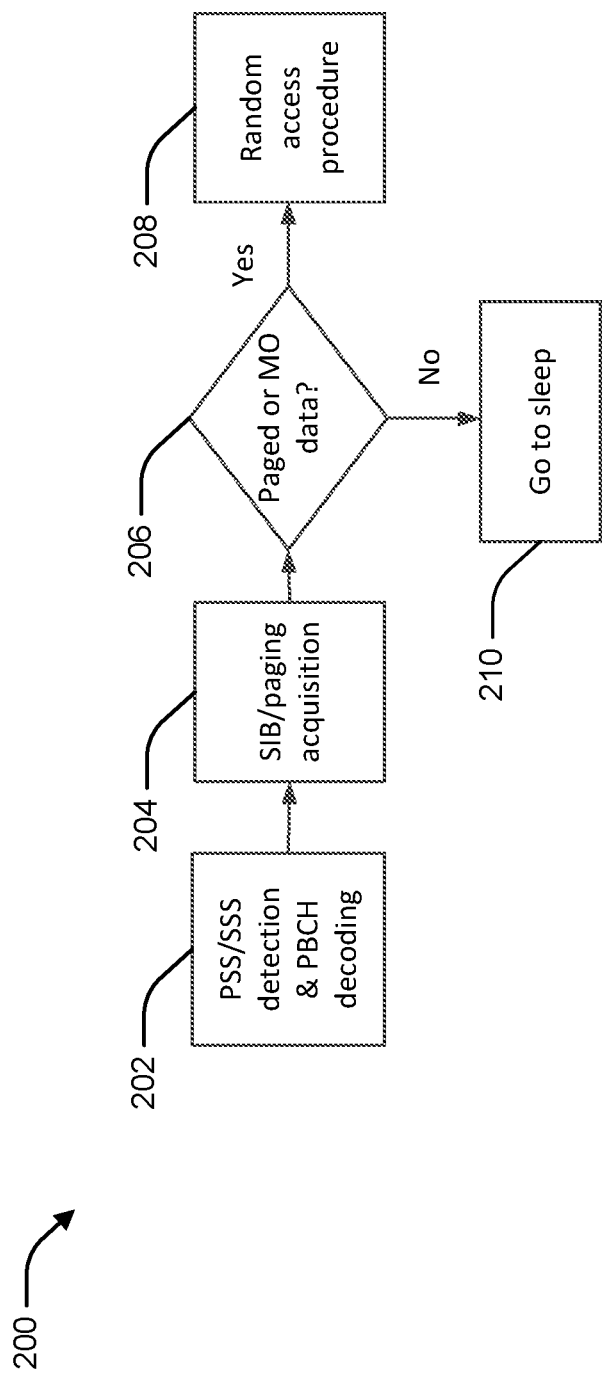
FIG. 2 is flowchart illustrating an initial cell acquisition procedure in accordance with an exemplary embodiment.

FIG. 2 is flowchart illustrating an example of an initial cell acquisition procedure 200. The initial cell acquisition procedure 200 may be performed by the components of a UE 110 operating in an idle state. When powering up, synchronization component 162 of UE 110 may, at block 202, initially acquire a serving cell by detecting a cell-specific synchronization channel (SYNC) to obtain time/frequency synchronization and detect a cell identifier (ID). The cell-specific synchronization channel may be transmitted periodically by a base station 105 to support initial acquisition. The SYNC may include a PSS and an SSS. At block 204, support component 164 of UE 110 may read a master information block (MIB) on a physical broadcast channel (PBCH) to obtain a configuration for acquiring the minimum system information block (MSIB). The MIB may also be referred to as an Access SIB (ASIB). The MSIB may be periodically broadcasted on the PDCCH or PDSCH. The MIB or MSIB can provide configuration to support UE in acquiring other system information block (OSIB). Additionally or alternatively, support component 164 of UE 110 may request SIBs using an uplink transmission procedure. The base station 105 may switch between broadcasting the SIBs and providing SIBs on demand. UE 110 may request SIB on-demand upon detection of a new synchronization signal, upon detection of an ASIB change, or upon expiration of previously cached system information. In an aspect, the MIB and/or SIB may carry a flag or information element indicating supported mobility modes. At block 206, mobility component 170 of UE 110 may decode the PDCCH and/or PDSCH for paging information (e.g., using a paging-radio network temporary identifier (P-RNTI). Mobility component 170 may determine whether UE 110 is paged based on the PDCCH and/or PDSCH or determine whether UE 110 has mobile originated (MO) or uplink data based on internal buffers. If UE 110 is paged or has MO or uplink data, in block 208, mobility component 170 may perform a random access procedure. If UE 110 is not paged or has no MO or uplink data, in block 210, UE 110 may go to sleep.

Figure 3:
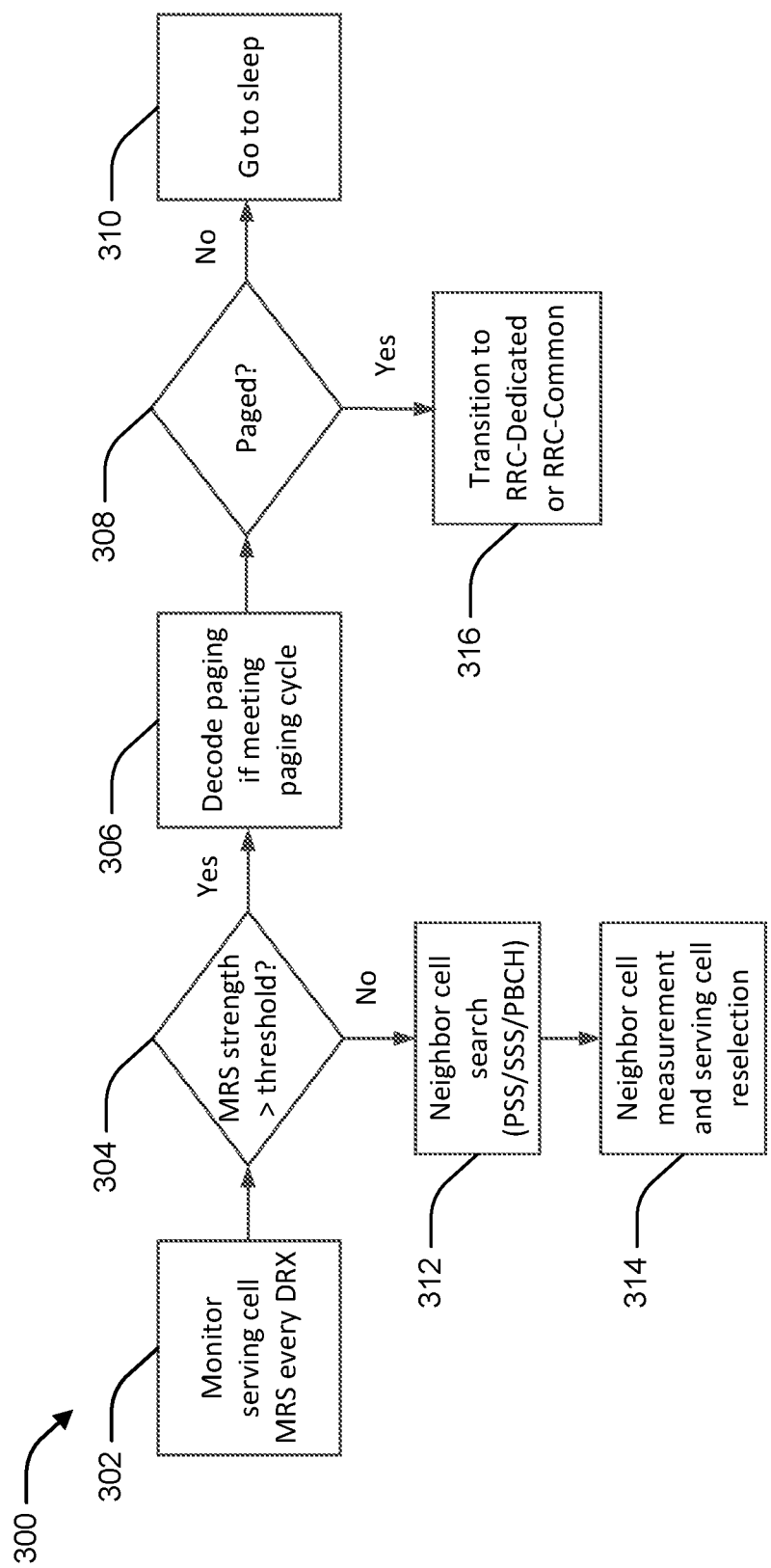
FIG. 3 is flowchart illustrating a downlink based mobility procedure in accordance with an exemplary embodiment.

FIG. 3 is flowchart illustrating an example of a downlink based mobility procedure 300. In an aspect, the blocks of FIG. 3 may be performed by the components of UE 110, e.g., by downlink component 172. At block 302, downlink component 172 may monitor a serving cell measurement reference signal (MRS) during every discontinuous reception (DRX) cycle. In block 304, downlink component 172 may compare a signal strength of the MRS to a threshold. If the signal strength of the MRS is less than or equal to the threshold, downlink component 172 may initiate a cell change. For example, in block 312, when the signal strength of the MRS is less than or equal to the threshold, synchronization component 162 may search for a neighbor cell by searching for a cell-specific SYNC, which may include a primary synchronization signal (PSS), a secondary synchronization signal (SSS) and a physical broadcast channel (PBCH). In block 314, once one or more neighbor cells are identified during the neighbor cell search, downlink component 172 may measure the neighbor cells (e.g., based on an MRS transmitted by each neighbor cell). Downlink component 172 may reselect the neighbor cell as the new serving cell for idle state based on the measurements. If the signal strength of the MRS is greater than the threshold, in block 306, mobility component 170 may decode a paging channel according to a paging cycle. In block 308, mobility component 170 may determine whether UE 110 is paged. If UE 110 is paged, in block 316, UE 110 may transition to either the RRC-Dedicated state or the RRC-Common state. If UE 110 is not paged, in block 310, UE 110 may go to sleep for the remainder of the DRX cycle while remaining camped on the serving cell.

When UE 110 is in an idle state, support component 164 of UE 110 may obtain information regarding the mobility modes supported by the network. In an aspect, the network may support downlink based mobility at least for UEs in the idle state. The network may also support downlink based mobility for UEs in a non-idle state. In order to support downlink based mobility, the network or a cell thereof may transmit a cell-specific SYNC. A cell may not need to transmit a zone-specific SYNC to support downlink mobility. The downlink based mobility procedure may operate as described above with respect to FIG. 3. In order to support uplink based mobility, a cell may transmit a zone-specific SYNC. The cell-specific SYNC may not be necessary for uplink-based mobility. For uplink based mobility, the cell may also support an uplink mobility procedure in which UE 110 transmits an uplink measurement indication signal, which may be referred to as a "chirp," on an uplink measurement indication channel (UMICH). The serving cell may respond to the chirp/UMICH with an acknowledgement and paging signal (KA). In order to support hybrid based mobility, the network or cell may transmit both a cell-specific SYNC and a zone-specific SYNC. The network may also perform both the downlink mobility procedure and the uplink mobility procedure.

In an aspect, when the network supports a hybrid mobility mode, UE 110 may select a mobility mode or a mobility procedure. The mobility mode may be selected based on at least one of a speed estimate, a location of the UE, a received signal strength of the serving cell or a received signal strength of a serving zone. For example, when the UE is moving at a high speed (e.g., at least 120 kilometers per hour) or the received signal strength of the serving cell or serving zone is poor (e.g., RSRP less than −100 dBm), UE 110 may select uplink based mobility. When the UE is moving at a low speed or the received signal strength of the serving cell or serving zone is good, UE 110 may select downlink based mobility. Further, UE 110 may apply a weight to each factor and determine a mobility mode based on the weighted factors.

Figure 4:
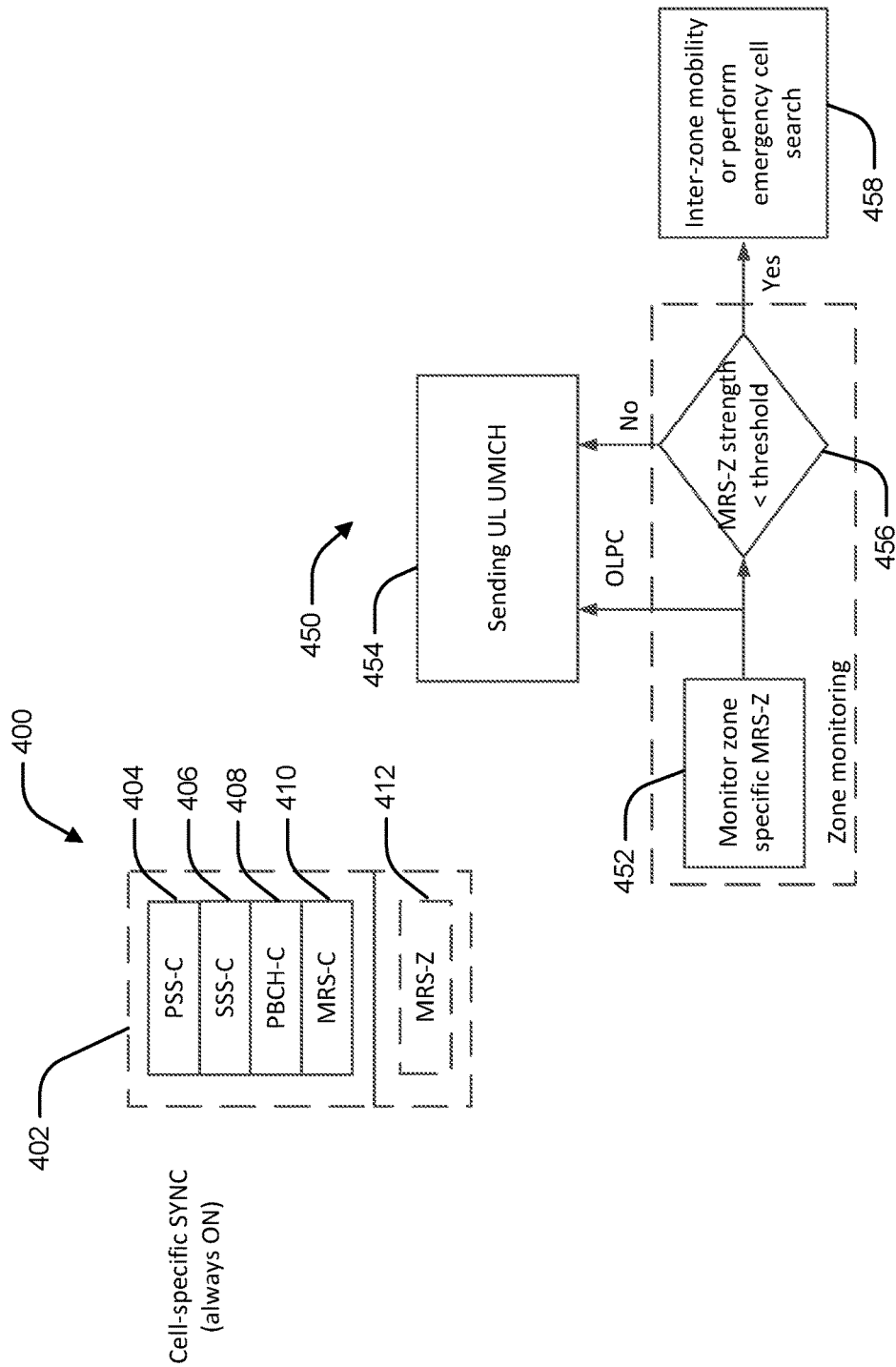
FIG. 4 is a block diagram illustrating a structure of synchronization channels and a flowchart for uplink based mobility in accordance with an exemplary embodiment.

FIG. 4 illustrates an example structure of synchronization channels 400 and a flowchart for an uplink based mobility procedure 450. In this example, the cell may broadcast a cell-specific SYNC channel 402. Cell-specific SYNC channel 402 may include a PSS-C 404, a SSS-C 406, a PBCH-C 408, and an MRS-C 410, each of which may be specific to the cell. The cell may not broadcast a zone-specific SYNC channel. The cell may optionally transmit a zone-specific MRS-Z 412. The cell may provide zone-specific information to the UE 110 via either a RRC message or system information (e.g., MIB or SIB). For example, the cell may provide a zone identifier and zone-specific timing information via an RRC message or system information. The UE 110 may use the zone-specific information to decode zone-specific MRS-Z 412. Decoding zone-specific MRS-Z 412 may confirm that the UE received the correct zone-specific information from the cell. Additionally, in block 452, uplink component 174 of UE 110 may perform zone monitoring based on zone-specific MRS-Z 412. Further, the zone-specific MRS-Z 412 may be used to determine an initial outer loop power control (OLPC) setting for UMICH transmission. In block 454, uplink component 174 may periodically send an uplink measurement indication signal on the uplink UMICH, and the network may change the serving cell based on reception of the UMICH. In block 456, uplink component 174 may compare the signal strength of the zone-specific MRS-Z 412 to a threshold. If the signal strength of zone-specific MRS-Z 412 becomes less than the threshold, in block 458, uplink component 174 may perform inter-zone mobility (e.g., based on a neighbor zone identified by the network) or perform an emergency cell search according to a downlink mobility procedure.

Figure 5:
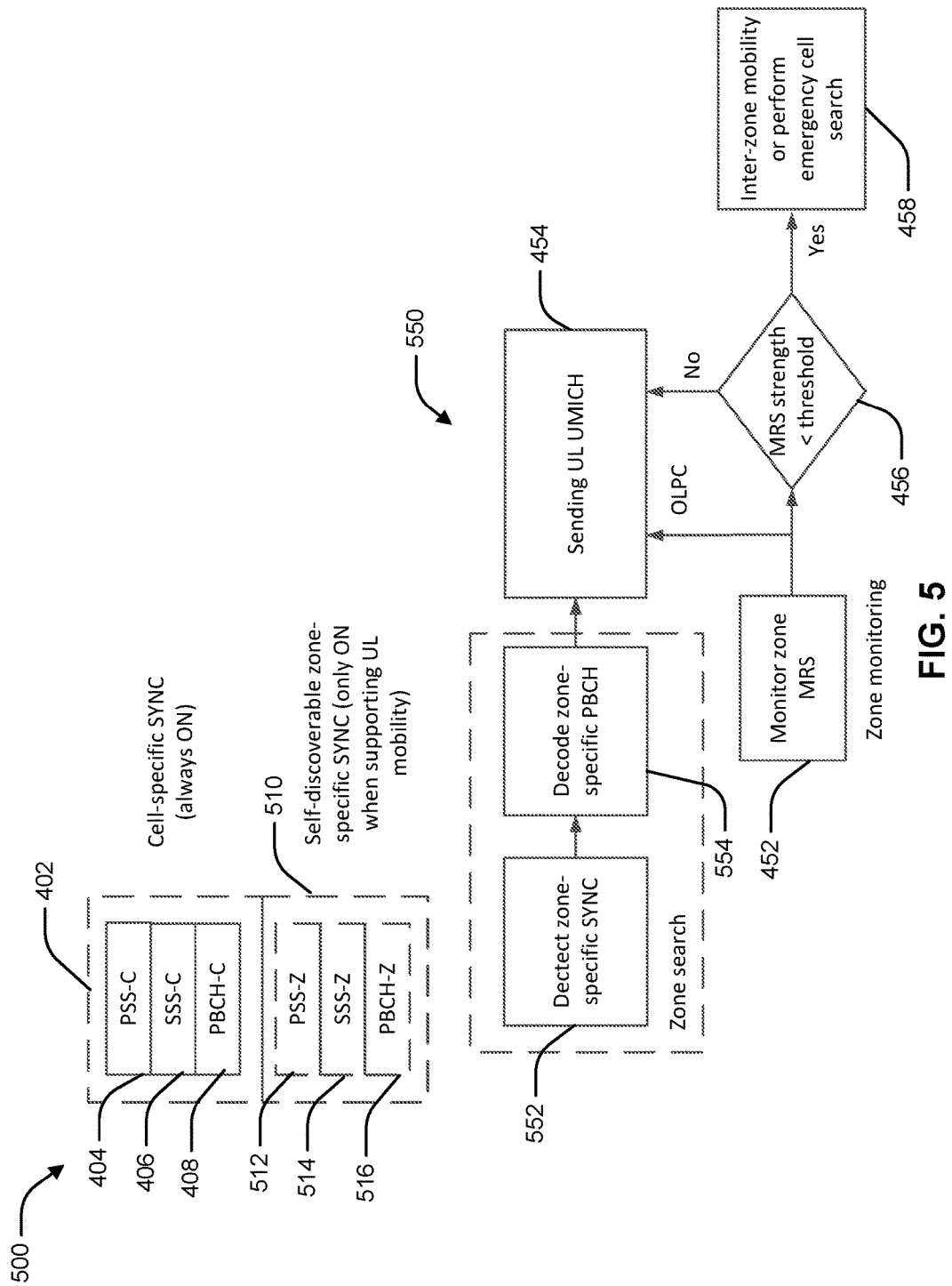
FIG. 5 is a block diagram illustrating a structure of synchronization channels and a flowchart for uplink based mobility in accordance with a second exemplary embodiment.

FIG. 5 illustrates another example of a structure 500 of synchronization channels and a flowchart for uplink based mobility procedure 550. In this example, the zone-specific information may be self-discoverable by a UE 110. For example, the cell may transmit cell-specific SYNC channel 402 including PSS-C 404, SSS-C 406, and PBCH-C 408 as well as zone-specific SYNC 510 including PSS-Z 512, SSS-Z 514, and PBCH-Z 516.

The uplink mobility procedure 550 may be performed by the components of UE 110. In block 552, synchronization component 162 of UE 110 may perform a zone search by detecting zone-specific SYNC 510. For example, a zone search procedure may be similar to a cell search procedure, except using PSS-Z 512 and SSS-Z 514 to detect the zone ID and timing/frequency. In block 554, support component 164 may then decode PBCH-Z 516, which may provide information for transmitting the UL UMICH. The rest of the uplink mobility procedure 550 may be similar to uplink based mobility procedure 450. After acquiring the zone, UE 110 may monitor zone-specific MRS-Z 412 in block 452. If in block 456, the signal strength of zone-specific MRS-Z 412 is less than a threshold, in block 458, UE 110 may perform inter-zone mobility (e.g., by acquiring a new zone) or performing an emergency cell search according to a downlink mobility procedure. If the signal strength of the MRS-Z is greater than or equal to the threshold, UE 110 may send the UL UMICH in block 454.

Figure 6:
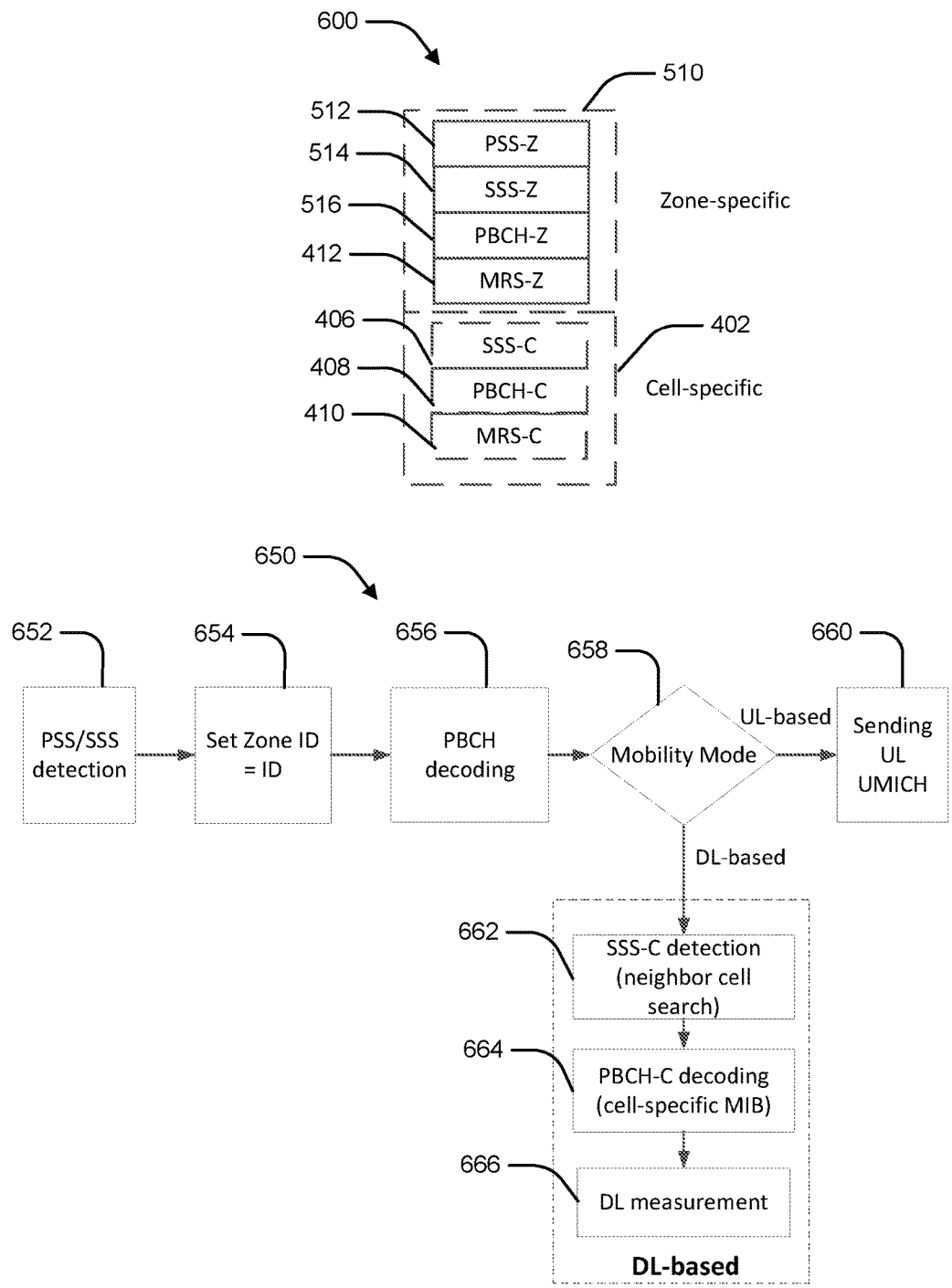
FIG. 6 is a block diagram illustrating a structure of synchronization channels and a flowchart for hybrid based mobility in accordance with a third exemplary embodiment.

FIG. 6 illustrates another example of a structure 600 of synchronization channels and a flowchart for hybrid based mobility procedure 650. In this example, the zone-specific information may be self-discoverable by a UE 110. For example, the cell may transmit zone-specific SYNC 510 including PSS-Z 512, SSS-Z 514, and PBCH-Z 516 and also transmit zone-specific MRS-Z 412. The cell may also optionally transmit cell-specific SYNC channel 402 including SSS-C 406, and PBCH-C 408 as well as MRS-C 410. Notably, the cell may not transmit a PSS-C 404 because the zone ID and the cell ID may be determined using PSS-Z 512, SSS-Z 514, and SSS-C 406 as will be described in further detail regarding FIG. 7.

The hybrid based mobility procedure 650 may be performed by components of UE 110, e.g., mobility component 170. In block 652, synchronization component 162 may detect PSS-Z 512 and SSS-Z 514. In block 654, based on the detected PSS-Z 512 and SSS-Z 514, synchronization component 162 may determine an ID. UE 110 may set the zone ID to the ID detected from PSS-Z 512 and SSS-Z 514. In block 656, support component 164 may decode PBCH-Z 516 based on the zone ID. PBCH-Z 516 may provide information necessary for transmitting the UMICH. In block 658, support component 164 may select a mobility mode. If support component 164 selects the uplink based mobility mode, in block 660, uplink component 174 may periodically transmit the UL UMICH and the network may change the serving cell as necessary. If support component 164 selects a downlink mobility procedure, UE 110 may need to further determine a cell ID. In block 662, synchronization component 162 may determine the cell ID by detecting SSS-C 406 using a neighbor cell search. In block 664, support component 164 may use the cell ID to decode PBCH-C 408 and obtain a cell-specific MIB, which may include different information than the zone-specific MIB. In block 666, downlink component 172 may use the cell-specific MIB for DL measurement to measure the signal strength of MRS-C 410 for the serving cell. Downlink component 178 may reselect a neighbor serving cell or report the signal strength of the serving cell and any neighbor cells according to the downlink based mobility procedure (e.g., downlink based mobility procedure 300).

Figure 7:
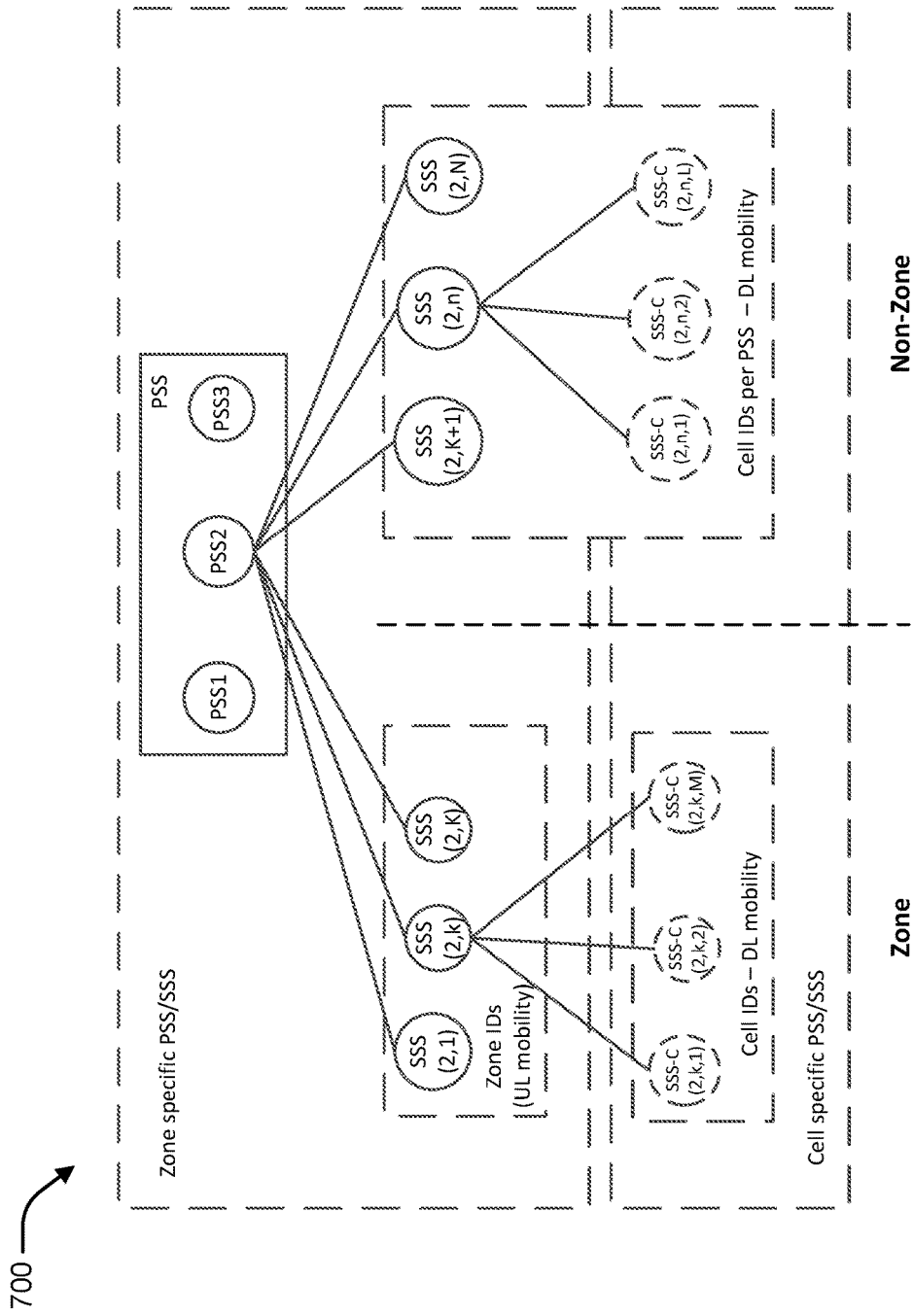
FIG. 7 is a conceptual diagram illustrating ID detection based on at least one primary synchronization signal (PSS), a secondary synchronization signal (SSS), and a cell-specific secondary synchronization signal (SSS-C) in accordance with an exemplary embodiment.

FIG. 7 is a conceptual diagram 700 illustrating an example of ID detection based on zone specific and cell specific PSS and SSS. In an aspect, multiple PSS sequences may be used. In addition to symbol timing detection, PSS may be used in channel frequency offset (CFO) estimation. Multiple PSS sequences may be used in non-zone deployments to reduce a single frequency network (SFN) effect on CFO estimation. Additionally, for non-zone deployments, cell IDs may be signaled using PSS-Z and two stage SSS signals (e.g., SSS-Z and SSS-C). For zone deployments, the two-stage SSS signals are available, but may not be combined to convey a cell ID. A cell within a zone deployment may transmit both a PSS-C and a SSS-C so that the cell ID is independently discoverable.

Figure 8:
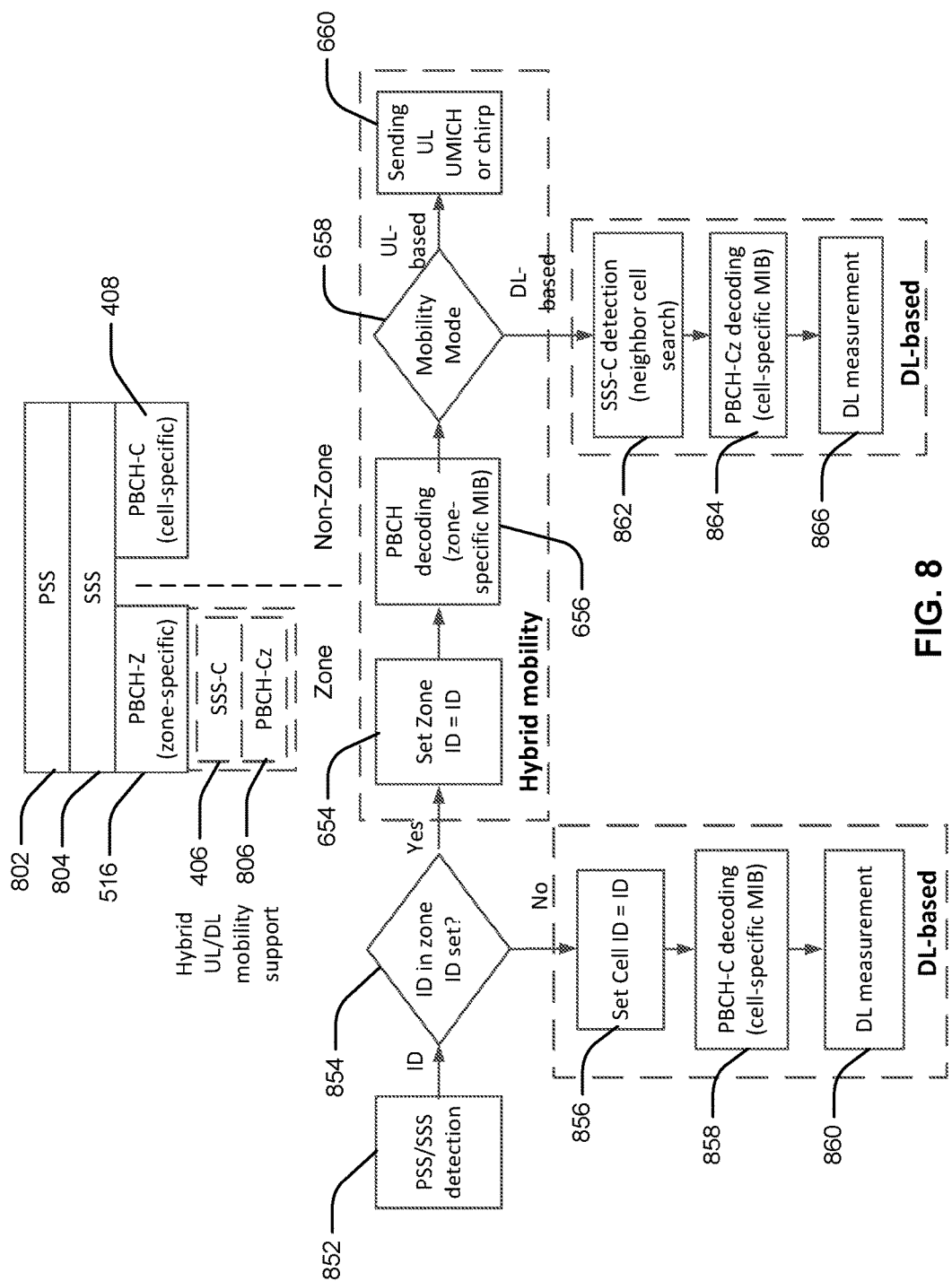
FIG. 8 illustrates a structure of synchronization channels and a flowchart for hybrid based mobility in accordance with an exemplary embodiment.

FIG. 8 illustrates another example of a structure 800 of synchronization channels and a flowchart for a hybrid based mobility procedure 850. In this example, the zone-specific information may be self-discoverable by a UE 110. The cell may transmit a single PSS 802 and SSS 804. The PSS/SSS ID space may be partitioned into two ID sets. One ID set (e.g., 0-255) may be interpreted as zone IDs to support uplink mobility. The second ID set (e.g., 256-503) may be interpreted as cell IDs to support DL-based mobility. For zone deployments, the cell may also transmit a PBCH-Z 516 and optionally transmit a SSS-C 406 and a PBCH-Cz 806. if hybrid mobility is supported. For non-zone deployments, cell may also transmit a PBCH-C 408.

The hybrid based mobility procedure 850 may be performed by components of UE 110, e.g., mobility component 170. In block 852, synchronization component 162 may detect PSS 802 and SSS 804 to determine an ID. In block 854, support component 164 may determine whether the detected ID is in the zone ID set. If the detected ID is not in the zone ID set, the cell may support only downlink based mobility. In block 856, UE 110 may interpret the detected ID as a cell ID and set the cell ID to the detected ID. In block 858, support component 164 may use the cell ID to decode PBCH-C 408 to obtain a cell-specific MIB. In block 860, downlink component 172 may use the cell-specific MIB to perform DL measurements for downlink based mobility.

Returning to block 854, if the detected ID is in the zone ID set, UE 110 may perform a hybrid based mobility procedure similar to the hybrid based mobility procedure 650 in FIG. 6. In block 654, UE 110 may interpret the detected ID as a zone ID and set the zone ID to the detected ID. In block 656, support component 164 may decode PBCH-Z 516 using the zone ID to obtain a zone specific MIB. For hybrid mobility, in block 658, selection component 176 may select a mobility mode. If selection component 176 selects a downlink based mobility mode, downlink component 172 may follow a downlink based mobility procedure similar to the downlink based portion of hybrid based mobility procedure 650 in FIG. 6. In block 862, synchronization component 162 may detect a cell ID based on SSS-C 406, SSS 804, and PSS 802. In block 864, support component 164 may then decode PBCH-Cz 806 to obtain a cell-specific MIB. In block 866, downlink component 172 may use the cell-specific MIB to perform DL measurements for downlink based mobility. Returning to block 658, if selection component 176 selects the uplink based mobility mode, in block 660, uplink component 174 may periodically transmit the UL UMICH/chirp and the network may change the serving cell as necessary.

Figure 9:
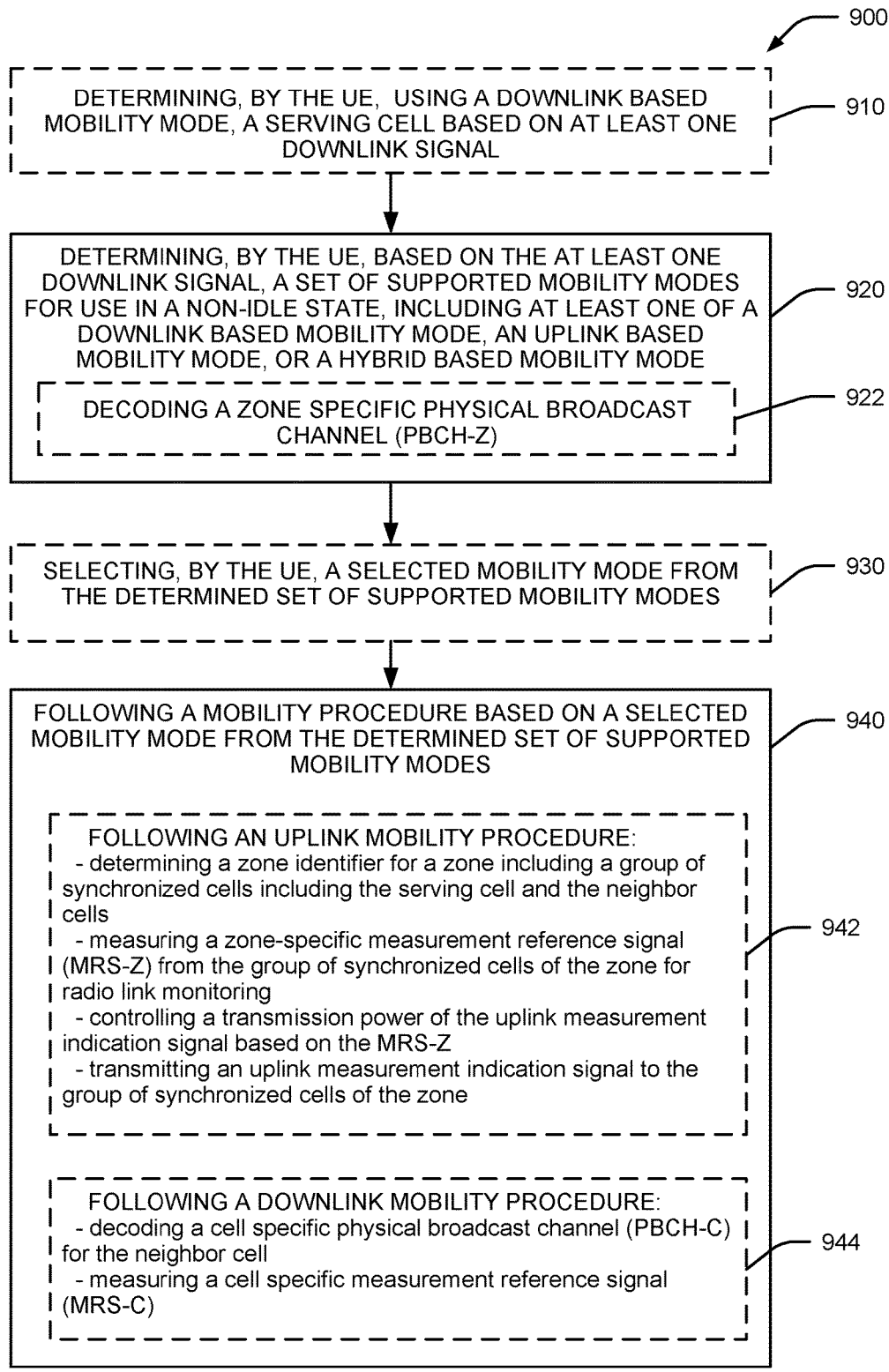
FIG. 9 is a flowchart of a method of one technique for flexible mobility in wireless communication in accordance with an exemplary embodiment.

FIG. 9 is a flowchart of an example method 900 of mobility for a UE. The method 900 may be performed using an apparatus (e.g., UE 110, for example). Although method 900 is described below with respect to the elements of UE 110, other components may be used to implement one or more of the steps described herein.

In block 910, method 900 may include determining, by the UE, a serving cell based on at least one downlink signal. In an aspect, for example, the synchronization component 162 may determine the serving cell based on at least one downlink component. The serving cell may be self-discoverable based on one or more synchronization signals. In an aspect, synchronization component 162 may detect a cell ID of a serving cell based on a PSS-C 404 and a SSS-C 406 transmitted by the serving cell. In another aspect, synchronization component 162 may detect a zone ID of a serving cell that is a member of a zone based on a PSS-Z 512 and an SSS-Z 514 transmitted by the zone. In another aspect, synchronization component 162 may detect an ID based on PSS 802 and SSS 804 and then determine whether the ID is a zone ID or a cell ID based on a value of the ID.

In block 920, method 900 may include determining, by the UE, based on the at least one downlink signal a set of supported mobility modes for the serving cell, including at least one of a downlink based mobility mode, an uplink based mobility mode, or a hybrid based mobility mode. In an aspect, support component 164 may determine, based on the at least one downlink signal, the set of supported mobility modes for the serving cell. For example, in block 922, support component 164 may decode a PBCH-Z 516 based on the zone ID, to obtain a zone specific MIB. The zone-specific MIB may include a flag or information element indicating a set of supported mobility modes. For non-zone cells, support component 164 may decode a PBCH-C 408 or determine that the cell does not support uplink based mobility because no zone ID is available.

In block 930, method 900 may optionally include selecting, by the UE, a selected mobility mode from the determined set of supported mobility modes. In an aspect, for example, selection component 176 may select the selected mobility mode from the determined set of supported mobility modes. For example, selection component 176 may select the mobility mode based on at least one of a speed estimate, a location of the UE, a received signal strength of the serving cell, or a received signal strength of a serving zone. In another aspect, the network may indicate a selected mobility mode to the UE 110, or if only a single mobility mode is supported, the single supported mobility mode may be the selected mobility mode.

In block 940, method 900 may include following a mobility procedure based on the selected mobility mode from the determined set of mobility modes. In an aspect, for example, the mobility component 170 may follow the mobility procedure based on the selected mobility mode from the determined set of mobility modes. For example, following the mobility procedure may include following an uplink based mobility procedure in block 942 or following a downlink based mobility procedure in block 944.

In block 942, uplink component 174 may follow an uplink based mobility procedure. The uplink based mobility procedure may be, for example, uplink based mobility procedure 450 or uplink based mobility procedure 550. The uplink based mobility procedure may also include uplink portions of hybrid based mobility procedure 650 and hybrid based mobility procedure 850. The uplink based mobility procedure may include determining a zone identifier for a zone including a group of synchronized cells including the serving cell and the neighbor cells. The uplink based mobility procedure may also include measuring a zone-specific MRS-Z 412 from the group of synchronized cells of the zone for radio link monitoring. The uplink based mobility procedure may also include controlling a transmission power of the uplink measurement indication signal based on zone-specific MRS-Z 412. The uplink based mobility procedure may also include transmitting an uplink measurement indication signal to the group of synchronized cells of the zone.

In block 944, downlink component 172 may follow a downlink based mobility procedure. In an aspect, the downlink based mobility procedure may be the downlink based mobility procedure 300. The downlink based mobility procedure may also include downlink portions of hybrid based mobility procedure 650 and/or hybrid based mobility procedure 850. The downlink based mobility procedure may include decoding a PBCH-C 408 for a neighbor cell. The downlink based mobility procedure may also include measuring MRS-C 410. UE 110 may then determine to reselect to the neighbor cell based on the measurement or transmit a measurement report based on the measurement.

Figure 10:
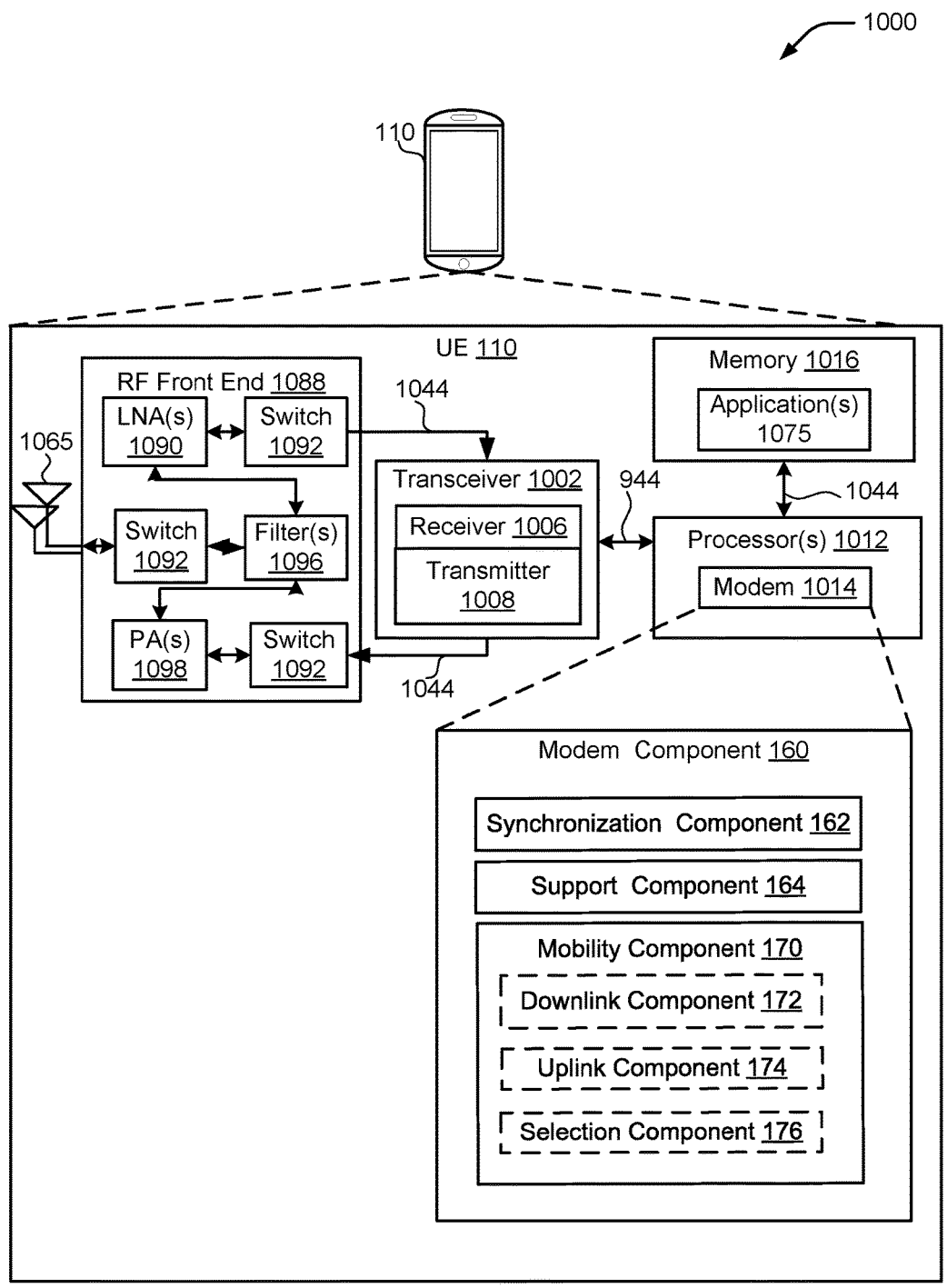
FIG. 10 is a schematic diagram of an aspect of an implementation of various components of the UE configured for communicating with a network entity, such as a base station, in accordance with an exemplary embodiment.

FIG. 10 schematically illustrates hardware components and subcomponents of UE 110 for implementing one or more methods (e.g., method 900) described herein in accordance with various aspects of the present disclosure. For example, one example of an implementation of UE 110 may include a variety of components, some of which have already been described above, but including components such as one or more processors 1012, memory 1016, and transceiver 1002 in communication via one or more buses 1044, which may operate in conjunction with modem component 160 to enable one or more of the functions described herein related to including one or more methods of the present disclosure. Further, the one or more processors 1012, modem 1014, memory 1016, transceiver 1002, RF front end 1088 and one or more antennas 1065, may be configured to support voice and/or data calls (simultaneously or non-simultaneously) in one or more radio access technologies.

In an aspect, the one or more processors 1012 can include a modem 1014 that uses one or more modem processors. The various functions related to modem component 160 may be included in modem 1014 and/or processors 1012 and, in an aspect, can be executed by a single processor, while in other aspects, different ones of the functions may be executed by a combination of two or more different processors. For example, in an aspect, the one or more processors 1012 may include any one or any combination of a modem processor, or a baseband processor, or a digital signal processor, or a transmit processor, or a receiver processor, or a transceiver processor associated with transceiver 1002. In other aspects, some of the features of the one or more processors 1012 and/or modem 1014 associated with modem component 160 may be performed by transceiver 1002.

Also, memory 1016 may be configured to store data used herein and/or local versions of applications or modem component 160 and/or one or more of its subcomponents being executed by at least one processor 1012. Memory 1016 can include any type of computer-readable medium usable by a computer or at least one processor 1012, such as random access memory (RAM), read only memory (ROM), tapes, magnetic discs, optical discs, volatile memory, non-volatile memory, and any combination thereof. In an aspect, for example, memory 1016 may be a non-transitory computer-readable storage medium that stores one or more computer-executable codes defining modem component 160 and/or one or more of its subcomponents, and/or data associated therewith, when UE 110 is operating at least one processor 1012 to execute UE modem component 160 and/or one or more of its subcomponents.

Transceiver 1002 may include at least one receiver 1006 and at least one transmitter 1008. Receiver 1006 may include hardware, firmware, and/or software code executable by a processor for receiving data, the code comprising instructions and being stored in a memory (e.g., computer-readable medium). Receiver 1006 may be, for example, a radio frequency (RF) receiver. In an aspect, receiver 1006 may receive signals transmitted by at least one base station 105. Additionally, receiver 1006 may process such received signals, and also may obtain measurements of the signals, such as, but not limited to, Ec/Io, SNR, RSRP, RSSI, etc. Transmitter 1008 may include hardware, firmware, and/or software code executable by a processor for transmitting data, the code comprising instructions and being stored in a memory (e.g., computer-readable medium). A suitable example of transmitter 1008 may including, but is not limited to, an RF transmitter.

Moreover, in an aspect, UE 110 may include RF front end 1088, which may operate in communication with one or more antennas 1065 and transceiver 1002 for receiving and transmitting radio transmissions, for example, wireless communications transmitted by at least one base station 105 or wireless transmissions transmitted by UE 110. RF front end 1088 may be connected to one or more antennas 1065 and can include one or more low-noise amplifiers (LNAs) 1090, one or more switches 1092, one or more power amplifiers (PAs) 1098, and one or more filters 1096 for transmitting and receiving RF signals.

In an aspect, LNA 1090 can amplify a received signal at a desired output level. In an aspect, each LNA 1090 may have a specified minimum and maximum gain values. In an aspect, RF front end 1088 may use one or more switches 1092 to select a particular LNA 1090 and its specified gain value based on a desired gain value for a particular application.

Further, for example, one or more PA(s) 1098 may be used by RF front end 1088 to amplify a signal for an RF output at a desired output power level. In an aspect, each PA 1098 may have specified minimum and maximum gain values. In an aspect, RF front end 1088 may use one or more switches 1092 to select a particular PA 1098 and a specified gain value for the particular PA 1098 based on a desired gain value for a particular application.

Also, for example, one or more filters 1096 can be used by RF front end 1088 to filter a received signal to obtain an input RF signal. Similarly, in an aspect, for example, a respective filter 1096 can be used to filter an output from a respective PA 1098 to produce an output signal for transmission. In an aspect, each filter 1096 can be connected to a specific LNA 1090 and/or PA 1098. In an aspect, RF front end 1088 can use one or more switches 1092 to select a transmit or receive path using a specified filter 1096, LNA 1090, and/or PA As such, transceiver 1002 may be configured to transmit and receive wireless signals through one or more antennas 1065 via RF front end 1088. In an aspect, transceiver may be tuned to operate at specified frequencies such that UE 110 can communicate with, for example, one or more base stations 105 or one or more cells associated with one or more base stations 105. In an aspect, for example, modem 1014 can configure transceiver 1002 to operate at a specified frequency and power level based on the UE configuration of UE 110 and the communication protocol used by modem 1014.

In an aspect, modem 1014 can be a multiband-multimode modem, which can process digital data and communicate with transceiver 1002 such that the digital data is sent and received using transceiver 1002. In an aspect, modem 1014 can be multiband and be configured to support multiple frequency bands for a specific communications protocol. In an aspect, modem 1014 can be multimode and be configured to support multiple operating networks and communications protocols. In an aspect, modem 1014 can control one or more components of UE 110 (e.g., RF front end 1088, transceiver 1002) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Although FIG. 10 illustrates hardware components and subcomponents of the UE 110, base station 105 may include similar components for implementing one or more methods described herein in accordance with various aspects of the present disclosure. For example, the base station 105 may include hardware components and subcomponents for transmitting the synchronization signals described herein.

Figure 11:
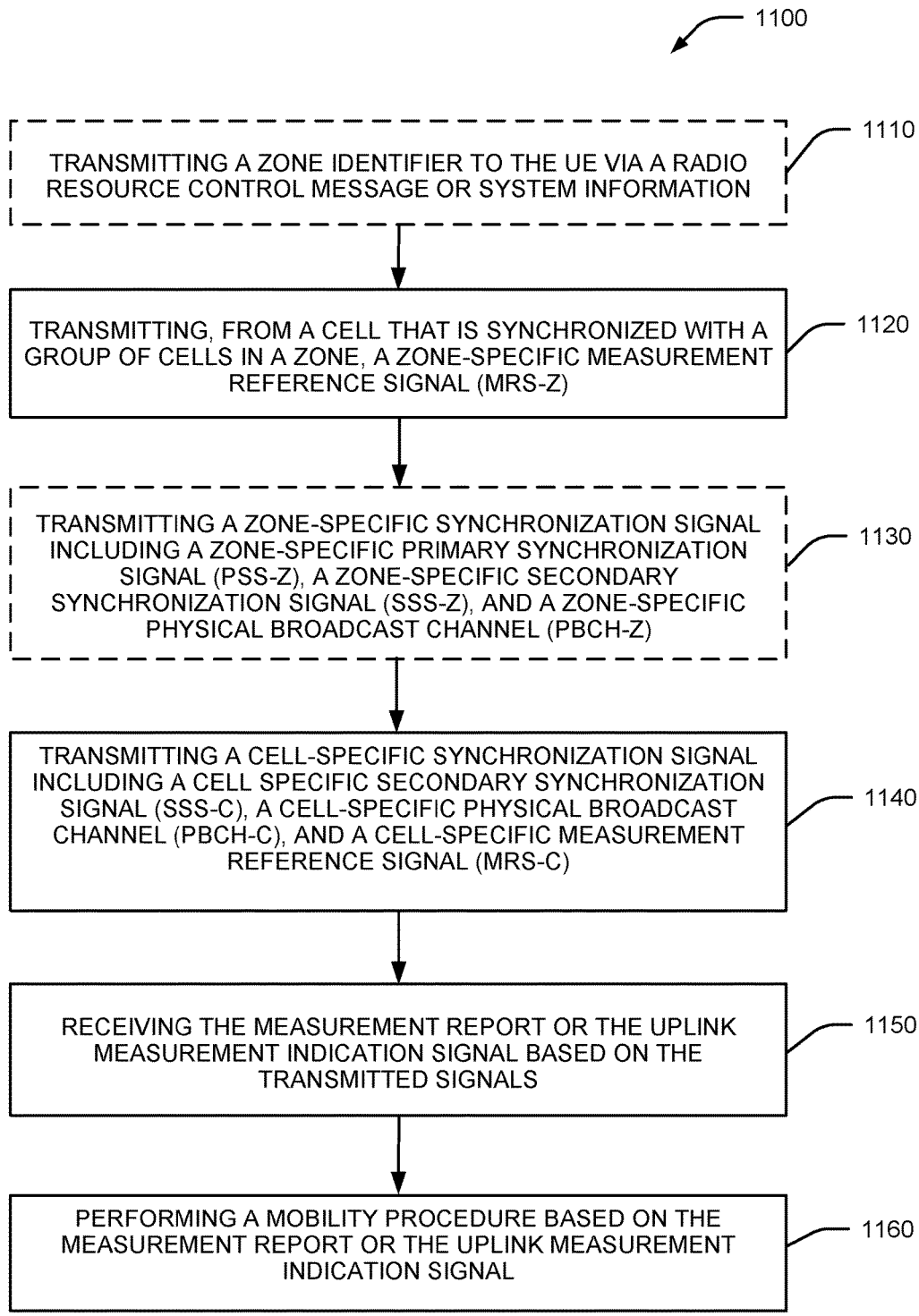
FIG. 11 is a flowchart of an example method of supporting mobility for a UE in accordance with an exemplary embodiment.

FIG. 11 is a flowchart of an example method 1100 of supporting mobility for a UE. The method 1100 may be performed using an apparatus (e.g., base station 105, for example). Although method 1100 is described below with respect to the elements of the base station 105, other components may be used to implement one or more of the steps described herein.

In block 1110, method 1100 may optionally include transmitting a zone identifier to the UE via a radio resource control message or system information. In an aspect, for example a transmitter of the base station 105 may transmit the zone identifier to the UE via a radio resource control message or system information. For example, the zone identifier may be included in an information element within the radio resource control message or the system information. The zone identifier may be used by the UE to decode a zone-specific channel such as a zone-specific PBCH.

In block 1120, the method 1100 may include transmitting from a cell that is synchronized with a group of cells in a zone, a zone-specific measurement reference signal (MRS-Z). In an aspect, for example, the base station 105 may transmit the MRS-Z 412. As discussed above, the MRS-Z 412 may include information for the UE 110 to transmit an uplink measurement indication signal. For example, the MRS-Z may be decoded to confirm that the zone identifier matches MRS-Z 412. The MRS-Z may also be monitored to determine a signal quality of the zone. The MRS-Z may also be used to determine power control of the uplink measurement indication signal.

In block 1130, method 1100 may optionally include transmitting, from a cell that is synchronized with a group of cells in a zone, a zone-specific synchronization signal including at least a zone-specific PSS, a zone-specific SSS, and a zone-specific PBCH. In an aspect, for example, the base station 105 may be synchronized with a group of cells in a zone and may transmit zone-specific SYNC 510 including PSS-Z 512, SSS-Z 514, and PBCH-Z 516. As discussed above with respect to FIG. 7, in some implementations, the UE may use the zone-specific synchronization signal to discover a zone identifier.

In block 1140, method 1100 may include transmitting a cell-specific synchronization signal including a cell specific SSS, a cell-specific PBCH-C, and a cell-specific MRS. The zone-specific PBCH may include information for transmitting a uplink measurement indication signal and the PBCH-C may include information for transmitting a measurement report. In an aspect, for example, base station 105 may transmit cell-specific SYNC channel 402 including at least SS S-C 406, PBCH-C 408, and MRS-C 410.

In block 1150, method 1100 may include receiving the measurement report or the uplink measurement indication signal based on the transmitted signals. In an aspect, for example, base station 105 may receive the measurement report or the uplink measurement indication signal from UE 110 based on the transmitted signals.

In block 1160, method 1100 may include performing a mobility procedure based on the measurement report or the uplink measurement indication signal. In an aspect, for example, base station 105 may perform the mobility procedure based on the measurement report or the uplink measurement indication signal. For example, the base station 105 may perform a downlink based mobility procedure based on the measurement report or perform an uplink based mobility procedure based on the uplink measurement indication signal.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

It should be noted that the techniques described above may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications for a user equipment (UE), comprising:
   determining, by the UE, a serving cell based on at least one downlink signal;
   determining, by the UE, based on the at least one downlink signal, a set of supported mobility modes for the serving cell, including at least one of a downlink based mobility mode, an uplink based mobility mode, or a hybrid based mobility mode;
   selecting, by the UE, a selected mobility mode from the determined set of supported mobility modes; and
   following, by the UE, a mobility procedure based on the selected mobility mode from the determined set of supported mobility modes.

2. The method of claim 1, wherein selecting the selected mobility mode is based on at least one of a speed estimate, a location of the UE, a received signal strength of the serving cell or a received signal strength of a serving zone.

3. The method of claim 1, wherein the following the mobility procedure according to a selected uplink based mobility mode comprises:
   determining a zone identifier for a zone including a group of synchronized cells including the serving cell and at least one neighbor cell;
   measuring a zone-specific measurement reference signal (MRS-Z) from the group of synchronized cells of the zone for radio link monitoring; and
   transmitting an uplink measurement indication signal to the group of synchronized cells of the zone.

4. The method of claim 3, further comprising controlling, by the UE, a transmission power of the uplink measurement indication signal based on the MRS-Z.

5. The method of claim 3, wherein determining the zone identifier comprises receiving system information including the zone identifier from the serving cell.

6. The method of claim 3, wherein determining the zone identifier for the zone comprises determining the zone identifier based on at least one synchronization signal transmitted by cells in the zone.

7. The method of claim 6, wherein the at least one synchronization signal includes a zone specific primary synchronization signal (PSS-Z) and a zone specific secondary synchronization signal (SSS-Z).

8. The method of claim 7, further comprising determining, by the UE, a cell identifier based on the at least one synchronization signal.

9. The method of claim 8, wherein determining the cell identifier comprises determining the cell identifier based on the PSS-Z, the SSS-Z, and a cell specific secondary synchronization signal (SSS-C).

10. The method of claim 1, wherein the at least one downlink signal includes a zone specific physical broadcast channel (PBCH-Z), wherein determining the set of supported mobility modes includes decoding the PBCH-Z.

11. The method of claim 10, further comprising:
    determining, by the UE, an identifier for a neighbor zone including a group of synchronized cells based on at least one synchronization signal transmitted by the neighbor zone, the at least one synchronization signal including a zone specific primary synchronization signal (PSS-Z) and a zone specific secondary synchronization signal (SSS-Z), wherein the serving cell is not included in the neighbor zone
    determining, by the UE, that the identifier is in a zone identifier set and that the identifier is a zone identifier;
    decoding, by the UE, the zone specific PBCH-Z using the zone identifier to determine that the zone supports hybrid based mobility; and
    selecting, by the UE, an uplink based mobility procedure.

12. The method of claim 1, further comprising:
    determining, by the UE, a zone identifier for a neighbor zone including a group of synchronized cells based on at least one synchronization signal transmitted by the neighbor zone, the at least one synchronization signal including a zone specific primary synchronization signal (PSS-Z) and a zone specific secondary synchronization signal (SSS-Z), wherein the serving cell is not included in the neighbor zone;
determining, by the UE, that the zone identifier is in a zone identifier set;
decoding, by the UE, a zone specific physical broadcast channel (PBCH-Z) to determine that the neighbor zone supports the hybrid based mobility mode within the neighbor zone;
determining, by the UE, a cell identifier for a neighbor cell within the neighbor zone based on a cell specific secondary synchronization signal (SSS-C);
wherein following the mobility procedure according to a selected mobility mode from the set of supported mobility modes comprises:
selecting, by the UE, a downlink based mobility procedure;
decoding, by the UE, a cell specific physical broadcast channel (PBCH-C) for the neighbor cell using the cell identifier; and
measuring, by the UE, a cell specific measurement reference signal (MRS-C) for the neighbor cell.

13. The method of claim 1, wherein following the mobility procedure for the selected mobility mode comprises:
determining, by the UE, an identifier based on at least one synchronization signal transmitted by a neighbor cell, the at least one synchronization signal including a zone specific primary synchronization signal (PSS-Z) and a zone specific secondary synchronization signal (SSS-Z);
determining, by the UE, that the identifier is not in a zone identifier set;
determining, by the UE, that the identifier is a cell identifier of the neighbor cell based on the identifier not being in the zone identifier set;
decoding, by the UE, system information from a cell specific physical broadcast channel (PBCH-C) of the neighbor cell using the cell identifier; and
measuring, by the UE, a cell specific measurement reference signal (MRS-C) for the neighbor cell.

14. An user equipment for wireless communications, comprising:
a transceiver configured to receive at least one downlink signal;
a memory; and
a processor communicatively coupled with the transceiver and the memory, the processor and the memory configured to:
determine a serving cell based on the at least one downlink signal;
determine, based on the at least one downlink signal, a set of supported mobility modes for the serving cell, including at least one of a downlink based mobility mode, an uplink based mobility mode, or a hybrid based mobility mode;
select a selected mobility mode from the determined set of supported mobility modes; and
follow a mobility procedure based on the selected mobility mode from the determined set of supported mobility modes.

15. The user equipment of claim 14, wherein the processor and the memory are configured to select the selected mobility mode based on at least one of a speed estimate, a location of the UE, a received signal strength of the serving cell or a received signal strength of a serving zone.

16. The user equipment of claim 14, wherein the processor and the memory are configured, for a selected uplink based mobility mode, to:
determine a zone identifier for a zone including a group of synchronized cells including the serving cell and at least one neighbor cell;
measure a zone-specific measurement reference signal (MRS-Z) from the group of synchronized cells of the zone for radio link monitoring; and
transmit an uplink measurement indication signal to the group of synchronized cells of the zone.

17. The user equipment of claim 16, wherein the processor and the memory are configured to autonomously control a transmission power of the uplink measurement indication signal based on the MRS-Z.

18. The user equipment of claim 16, wherein the processor and the memory are configured to determine the zone identifier by receiving system information including the zone identifier from the serving cell.

19. The user equipment of claim 16, wherein the processor and the memory are configured to determine the zone identifier based on at least one synchronization signal transmitted by cells in the zone.

20. The user equipment of claim 19, wherein the at least one synchronization signal includes a zone specific primary synchronization signal (PSS-Z) and a zone specific secondary synchronization signal (SSS-Z).

21. The user equipment of claim 14, wherein the at least one downlink signal includes a zone specific physical broadcast channel (PBCH-Z), wherein the processor and the memory are configured to decode the PBCH-Z to determine the set of supported mobility modes includes decoding the PBCH-Z.

22. The user equipment of claim 21, wherein the processor and the memory are configured to:
determine an identifier for a neighbor zone including a group of synchronized cells based on at least one synchronization signal transmitted by the neighbor zone, the at least one synchronization signal including a zone specific primary synchronization signal (PSS-Z) and a zone specific secondary synchronization signal (SSS-Z), wherein the serving cell is not included in the neighbor zone
determine that the identifier is in a zone identifier set and that the identifier is a zone identifier;
decode the zone specific PBCH-Z using the zone identifier to determine that the zone supports hybrid based mobility; and
select an uplink based mobility procedure.

23. The user equipment of claim 14, wherein the processor and the memory are configured to:
determine a zone identifier for a neighbor zone including a group of synchronized cells based on at least one synchronization signal transmitted by the neighbor zone, the at least one synchronization signal including a zone specific primary synchronization signal (PSS-Z) and a zone specific secondary synchronization signal (SSS-Z), wherein the serving cell is not included in the neighbor zone;
determine that the zone identifier is in a zone identifier set;
decode a zone specific physical broadcast channel (PBCH-Z) to determine that the neighbor zone supports the hybrid based mobility mode within the neighbor zone;
determine by the UE, a cell identifier for a neighbor cell within the neighbor zone based on a cell specific secondary synchronization signal (SSS-C); and select a downlink based mobility procedure;
decode a cell specific physical broadcast channel (PBCH-C) for the neighbor cell using the cell identifier; and
measure a cell specific measurement reference signal (MRS-C) for the neighbor cell.

24. The user equipment of claim 14, wherein the processor and the memory are configured to:
determine an identifier based on at least one synchronization signal transmitted by a neighbor cell, the at least one synchronization signal including a zone specific primary synchronization signal (PSS-Z) and a zone specific secondary synchronization signal (SSS-Z);
determine that the identifier is not in a zone identifier set;
determine that the identifier is a cell identifier of the neighbor cell based on the identifier not being in the zone identifier set;
decode system information from a cell specific physical broadcast channel (PBCH-C) of the neighbor cell using the cell identifier; and
measure a cell specific measurement reference signal (MRS-C) for the neighbor cell.

25. A method of wireless communications comprising:
transmitting, from a cell that is synchronized with a group of cells in a zone, a zone-specific measurement reference signal (MRS-Z);
transmitting a cell-specific synchronization signal including a cell specific secondary synchronization signal (SSS-C), a cell-specific physical broadcast channel (PBCH-C), and a cell-specific measurement reference signal (MRS-C), wherein the MRS-Z includes information for a user equipment (UE) to transmit an uplink measurement indication signal and the PBCH-C includes information for the UE to transmit a measurement report;
transmitting a zone identifier to the UE via a radio resource control message or system information, wherein the zone identifier allows the UE to decode the MRS-Z for zone monitoring and power control of the uplink measurement indication signal;
receiving the measurement report or the uplink measurement indication signal based on the transmitted signals; and
performing a mobility procedure based on the measurement report or the uplink measurement indication signal.

26. An apparatus for wireless communications comprising:
a transceiver configured to transmit at least one downlink signal;
a memory; and
a processor communicatively coupled with the transceiver and the memory, wherein the processor and the memory are configured to:
transmit a zone-specific measurement reference signal (MRS-Z);
transmit a cell-specific synchronization signal including a cell specific secondary synchronization signal (SSS-C), a cell-specific physical broadcast channel (PBCH-C), and a cell-specific measurement reference signal (MRS-C), wherein the MRS-Z includes information for a user equipment (UE) to transmit an uplink measurement indication signal and the PBCH-C includes information for the UE to transmit a measurement report;
transmit a zone identifier to the UE via a radio resource control message or system information, wherein the zone identifier allows the UE to decode the MRS-Z for zone monitoring and power control of the uplink measurement indication signal;
receive the measurement report or the uplink measurement indication signal based on the transmitted signals; and
perform a mobility procedure based on the measurement report or the uplink measurement indication signal.

* * * * *